US008554498B2

(12) United States Patent
Gustavsson et al.

(10) Patent No.: US 8,554,498 B2
(45) Date of Patent: Oct. 8, 2013

(54) METHOD, SYSTEM AND COMPUTER PROGRAM FOR ESTIMATION OF THE PRESSURE

(75) Inventors: Fredrik Gustavsson, Linköping (SE); Anders Stenman, Linköping (SE); Tony Gustafsson, Askim (SE); Peter Lindskog, Linköping (SE); Peter Hall, Linköping (SE); Urban Forssell, Linköping (SE)

(73) Assignee: Nira Dynamics AB, Linkoping (SE)

( * ) Notice: Subject to any disclaimer, the term of this patent is extended or adjusted under 35 U.S.C. 154(b) by 544 days.

(21) Appl. No.: 12/531,684

(22) PCT Filed: Mar. 16, 2007

(86) PCT No.: PCT/EP2007/002372
§ 371 (c)(1),
(2), (4) Date: Mar. 26, 2010

(87) PCT Pub. No.: WO2008/113384
PCT Pub. Date: Sep. 25, 2008

(65) Prior Publication Data
US 2010/0191483 A1    Jul. 29, 2010

(51) Int. Cl.
*G01F 17/00*    (2006.01)
(52) U.S. Cl.
USPC ........................................................... 702/50
(58) Field of Classification Search
USPC ............................................................ 702/50
See application file for complete search history.

(56) References Cited

U.S. PATENT DOCUMENTS

| 4,574,267 A | 3/1986 | Jones |
| 5,553,491 A | 9/1996 | Naito et al. |
| 5,557,552 A | 9/1996 | Naito et al. |

(Continued)

FOREIGN PATENT DOCUMENTS

| DE | 40 19 501 | 4/1991 |
| DE | 198 59 225 | 7/1999 |

(Continued)

OTHER PUBLICATIONS

PCT International Search Report for PCT Counterpart Application No. PCT/EP2007/002372 containing Communication relating to the Results of the Partial International Search Report, 3 pgs., (Dec. 4, 2007).

(Continued)

*Primary Examiner* — Stephen Cherry
(74) *Attorney, Agent, or Firm* — Blakely Sokoloff Taylor & Zafman LLP

(57) ABSTRACT

The invention is directed to a system, a method and a computer program including program code for carrying out the method, when executed on a processing system, of estimating a tire pressure deviation of a vehicle's tire (2). The system includes an input section (100) adapted to receive as an input signal a vehicle signal, a calculation section (200) adapted to calculate at least one shape factor of a resonance peak associated with the vehicle signal spectrum (2) on the basis of the input signal, and a determination section (300) adapted to derive, depending on said at least one shape factor, a tire pressure signal indicative of a tire pressure deviation within the vehicle's tire (2).

9 Claims, 5 Drawing Sheets

(56) References Cited

U.S. PATENT DOCUMENTS

Figure 1:
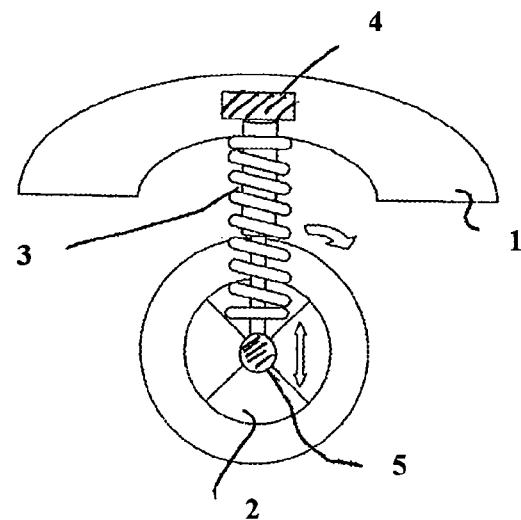

| | | | |
|---|---|---|---|
| 5,583,483 | A | 12/1996 | Baumann |
| 6,109,099 | A | 8/2000 | Kawai et al. |
| 6,501,373 | B2 | 12/2002 | Kitano |
| 6,877,371 | B1 | 4/2005 | Walenty et al. |
| 7,203,612 | B2 | 4/2007 | Kobe et al. |
| 2002/0024432 | A1 | 2/2002 | Lin et al. |
| 2002/0157461 | A1 | 10/2002 | Schmidt et al. |
| 2003/0050743 | A1 | 3/2003 | Caretta et al. |
| 2003/0187555 | A1 | 10/2003 | Lutz et al. |
| 2003/0227380 | A1 | 12/2003 | Piech et al. |
| 2004/0056528 | A1 | 3/2004 | Naruse |
| 2004/0111276 | A1 | 6/2004 | Inge |
| 2004/0164140 | A1 | 8/2004 | Voeller et al. |
| 2004/0260436 | A1 | 12/2004 | Kin |
| 2005/0159534 | A1 | 7/2005 | Ronlan |
| 2005/0192727 | A1 | 9/2005 | Shostak et al. |
| 2006/0001533 | A1 | 1/2006 | Bessho et al. |
| 2006/0025897 | A1 | 2/2006 | Shostak et al. |
| 2006/0276984 | A1* | 12/2006 | Kobe et al. ................ 702/75 |
| 2007/0061100 | A1 | 3/2007 | Hall et al. |
| 2007/0186634 | A1 | 8/2007 | Burghardt et al. |
| 2010/0042549 | A1 | 2/2010 | Adamczyk et al. |

FOREIGN PATENT DOCUMENTS

| | | |
|---|---|---|
| DE | 103 31 585 | 3/2005 |
| DE | 10 2005 004910 A1 | 9/2005 |
| EP | 0 578 826 | 1/1994 |
| EP | 0 783 982 | 7/1997 |
| JP | 05-055322 A | 3/1993 |
| JP | 5133831 | 5/1993 |
| JP | 2836652 | 12/1998 |
| JP | 2000-318417 A | 11/2000 |
| WO | WO 2005/005173 A1 | 1/2005 |
| WO | WO 2007/054585 A2 | 5/2007 |

OTHER PUBLICATIONS

PCT Notification of Transmittal of the International Search Report and the Written Opinion of the International Searching Authority, or the Declaration for PCT Counterpart Application No. PCT/EP2007/002372 Containing International Search Report, 12 pgs. (Dec. 4, 2007).

PCT Notification ot Transmittal of International Preliminary Examination Report for PCT Application No. PCT/EP2007/002366, 6 pgs. (Sep. 22, 2009).

* cited by examiner

METHOD, SYSTEM AND COMPUTER PROGRAM FOR ESTIMATION OF THE PRESSURE

CROSS-REFERENCE TO RELATED APPLICATION

This patent application is a U.S. National Phase application under 35 U.S.C. §371 of International Application No. PCT/EP2007/002372, filed on Mar. 16, 2007, entitled METHOD, SYSTEM AND COMPUTER PROGRAM FOR ESTIMATION OF THE PRESSURE.

FIELD OF THE INVENTION

The present invention relates generally to the estimation of tire pressure of a vehicle's tire and, in particular, to a method, a system, and a computer program for estimating the tire pressure.

BACKGROUND OF THE INVENTION

Modern cars comprise electronic control systems as anti-lock-braking systems (ABS), dynamic stability systems, anti-spin systems and traction control systems. Besides these active control systems there also exist driver safety information systems as road friction indicators and tire pressure monitoring systems which present information about the driving condition to the driver. Some types of these tire pressure monitoring systems determine lowering of the tire pressure based on indirect detection values of a modern vehicle, such as the wheel speed signals, etc.

Known indirect tire pressure monitoring systems are based on either monitoring a change in roll-radius or vibration spectra derived from the wheel speed signals. Such a roll-radius approach is disclosed in the Japanese application JP 5-55322, where wheel rolling speeds derived from the tire's specific wheel speed signals are compared to each other for each pair of diagonally disposed tires. Such systems can detect one or three under-inflated tires. Model-based roll-radius approaches using longitudinal and lateral dynamic models can detect one, two or three tires with low pressure. However, roll-radius approaches cannot solve the problem with diffusion, when all four wheels slowly become under-inflated. Such a situation may be detected with the known vibration spectrum approach which is based on the physical fact that the spring-damper dynamics in the tire changes with air pressure. The Japanese patent JP 2836652 discloses a system adopting this approach for detecting under-inflated tires, based on the property that the resonance peak in the vibration spectrum shifts in frequency after a pressure change, and this peak frequency value is continuously monitored and compared to a reference value. This patent also discloses to adapt this reference value with the vehicle's speed. The patent EP 0 783 982 B1 adopting the same approach further includes the case of monitoring several resonance peaks from the upward-downward and forward-backward movements of an unsprung mass (wheel). The main drawbacks of monitoring only the peak value is a high sensitivity to the tire type, vehicle speed and road surface. Similarly, EP 578 826 A1 discloses to detect resonance peaks related to vertical and longitudinal directions of the vehicle's unsprung mass and to derive the tire pressure from the resonance frequencies of these resonance peaks.

The patent US 2004/0260436 monitors the whole spectrum, rather than just the peak value, by cross correlating the current spectrum with a reference spectrum in order to decrease the sensitivity to the tire type, vehicle speed and road surface. One drawback with this method is the large requirement of computational speed and memory to compute the spectrum at a large number of frequency grid points. Another drawback is the lack of robustness to many problems encountered in practice, such as spurious frequency components in the spectrum either caused by random noise or by interference from other rotating parts of the vehicle and its driveline. A random noise component in the current spectrum can give a large difference in the computed correlation value between reference and current spectrum, and thus may cause false alarms or missed detections.

The general problem to be solved by the present invention is to improve the performance of an indirect tire pressure monitoring system.

The problem will be solved by the subject matter of the independent claims. Preferred embodiments are disclosed in the dependent claims.

A first aspect of the invention is directed to a method of estimating a tire pressure deviation of a vehicle's tire. The method comprises the steps of receiving as an input signal a vehicle signal, calculating at least one shape factor of a is resonance peak associated with the vehicle signal spectrum on the basis of the input signal; and determining, depending on said at least one shape factor, a tire pressure signal indicative of a tire pressure deviation within the vehicle's tire.

Another aspect of the invention is directed to a system of estimating the tire pressure deviation. The system comprises a receiving section adapted to receive as an input signal a vehicle signal, a calculation section adapted to calculate at least one shape factor of a resonance peak associated with the vehicle signal spectrum on the basis of the input signal, and a determining section adapted to derive, depending on said at least one shape factor, a tire pressure signal indicative of a tire pressure deviation within the vehicle's tire.

A further aspect of the invention is directed to a computer program including program code for carrying out a method, when executed on a processing system, of estimating a tire pressure deviation of a driving vehicle, the method comprises the steps of receiving as an input signal a vehicle signal, calculating at least one shape factor of a resonance peak associated with the vehicle signal spectrum on the basis of the input signal, and determining, depending on said at least one shape factor, a tire pressure signal indicative of a tire pressure deviation within the vehicle's tire.

Figure 2:
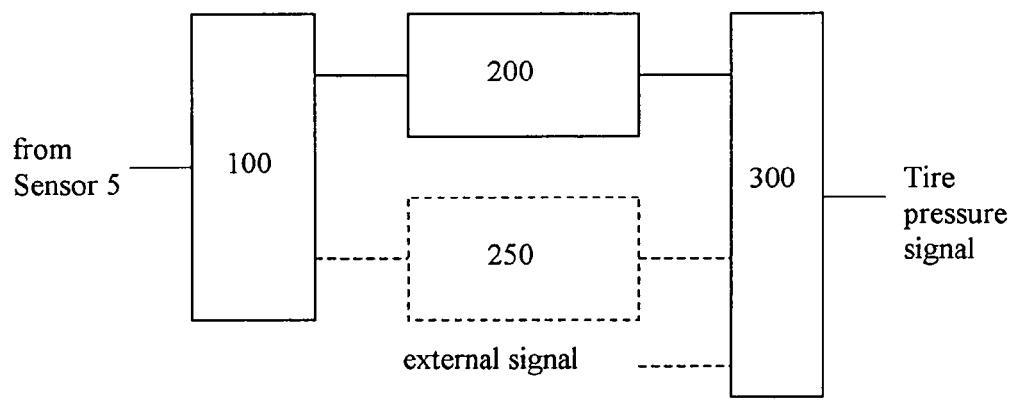
Figure 4A:
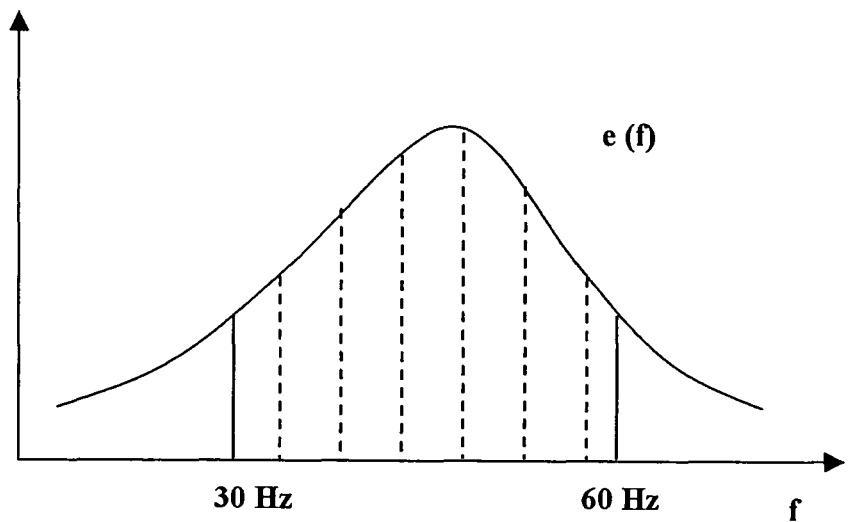

Embodiments of the invention will now be described, by way of example, and with reference to the accompanying drawings, in which:

FIG. 1 schematically shows a tire suspension provided with a wheel speed sensor and a suspension sensor;

FIG. 2 schematically shows the structure of an embodiment of the tire pressure estimation system according to the invention;

FIGS. 3a-f show graphs of a frequency spectrum after normalization illustrating the height (H), the width (W), the peaks slope (S), the peaks height (HN) compared to noise floor level (NFL), the peak's integral (I) and the peak's integral (IN) down to noise floor level (NFL), respectively, of the resonance peak as a shape factor;

FIGS. 4a,b show graphs of a frequency spectrum after normalization illustrating a multidimensional feature in a single frequency band and in two different frequency bands, respectively.

DETAILED DESCRIPTION OF THE PREFERRED EMBODIMENTS

FIG. 1 schematically illustrates by way of example the wheel suspension of one vehicle's tire. The wheel 2 is mounted to the bottom end of a suspension 3. The top end of the suspension 3 is mounted to the chassis 2 of the vehicle. The suspension 3 absorbs the vertical movements of the running wheel 2. A suspension sensor 4 is provided at the top end of the suspension 3 and a wheel speed sensor 5 at the wheel mount. The output signals of the sensors 4 and 5 are fed to the vehicle's signal bus from where they might be retrieved by the corresponding modules (such as the ABS module and the like) using at least one of these signals as their input signals.

The vehicle is provided with a system of estimating a tire pressure. The system comprises an input section 100, a shape factor calculation section 200, an optional multidimensional feature extraction section 250 and a tire pressure determination section 300.

The input section 100 receives as an input signal the wheel speed signal from the wheel speed sensor 5. This signal may be provided in the form of a succession of digitized speed signal samples (e.g. with a sample rate of 10 Hz). Alternatively or supplementary, the input section 100 may also receive other vehicle's signals, such as the suspension signal from the suspension sensor 4 and the like. It may preprocess the input signal thus received and outputs the same to the calculation section 200.

In a first embodiment, the shape factor calculation section 200 calculates the wheel speed spectrum of the wheel speed signal provided from the wheel speed sensor 5 by using, for instance, a discrete Fourier transformation (DFT) or fast Fourier transformation (FFT). It, then, searches a resonance peak within the wheel speed spectrum by focusing, for instance, on a certain frequency range within the spectrum (such as 20-100 Hz). This peak search might be performed by any of the standard procedures known to the skilled person wherein such standard procedures include taking the maximum after smoothing the computed spectra by averaging over time and frequency to get a well-defined peak. For instance, assuming that P(f) is a smoothed estimate of the wheel speed spectrum of the wheel speed signal as a function of the frequency f, the peak can be found by locating the maximum value of P(f); where f is restricted to be in a certain frequency interval (such as 20-70 Hz). An alternative way to locate the resonance peak is to compute the center of gravity CoG of the estimated wheel speed spectrum according to the following formula:

$$CoG = \frac{\int f \cdot P(f) df}{\int P(f) df}$$

The shape factor calculation section 200 then determines a shape factor of the resonance peak which describes a characteristic of the peak shape (cp. below).

In a second embodiment, the shape factor calculation section 200 uses the wheel speed signal to determine at least one parameter of a parametric model without transforming this signal into the frequency domain. Thereby, at first the autocorrelation function of the wheel speed signal might be first determined and the parametric model applied to the autocorrelated signal thus determined. The parametric model is chosen such that its at least one parameter reflects at least one of the shape factors of the resonance peak in the wheel speed spectrum. For instance, if one assumes a Gaussian shaped resonance peak within the frequency spectrum being parameterized by the peak width b, then the corresponding peak shape in the signal domain is also a Gaussian shape having the inverse peak width 1/b (more precisely, if the Gaussian peak in the spectrum is centered at e.g. 45 Hz, then the autocorrelated signal in the time domain is a Gaussian modulated with a 45 Hz sinusoid, however, the mentioned relation between the peak widths of the two Gaussian peaks is still valid). Thus, the parametric model of the Gaussian peak having the parameter 1/b as its parameter may be fitted (e.g. by a least square fit) to the wheel speed signal by varying the peak width 1/b in order to find the best fit. Thus, as can be easily seen, the at least one parameter of the parametric model (parameter 1/b) is chosen such as to reflect a shape factor (peak width b) of the resonance peak within the wheel speed spectrum.

Different types of parametric models can be used, such as AR or orthonormal basis functions, wherein AR or orthonormal basis functions can be of different orders. So-called AR models are time-domain models of random processes. AR-models are based on the assumption that the current signal value y[n], wherein n denotes the sample number, can be written as a linear function of preceding signal values y[n−m] as follows:

$$y[n]=a_1*y[n-1]+a_2*y[n-2]+\ldots+a_m*y[n-m]+e[n]$$

wherein $a_1, a_2, \ldots, a_m$ are the AR-coefficients, and e[n] is white noise. The AR-coefficients of the recorded wheel speed signal are determined according to well-known procedures and used by the shape factor calculation section 300 to calculate the relevant shape factors. In comparison to the afore mentioned DFT or FFT based approaches that usually require numerous, such as 10 to 100, frequency grid points the AR model approach only estimates a few, such as 2 to 10, model parameters (AR-coefficients) from the wheel speed signal, and is hence less memory and computationally intensive. The AR model approach is also physically motivated since an ideal spring-damper can be modeled with only two AR parameters (AR-coefficients), and automatically performs spectral smoothing so no post-processing is needed. Finally, the spectral shape features are advantageously simple functions of the AR-coefficients, such as follows:

The width of the resonance is proportional to $1/\sqrt{a_2}$, or

The integral of the peak is proportional to $\arccos(-a_1/2/\sqrt{a_2})/\sqrt{a_2}$, and the like.

Figure 3A:
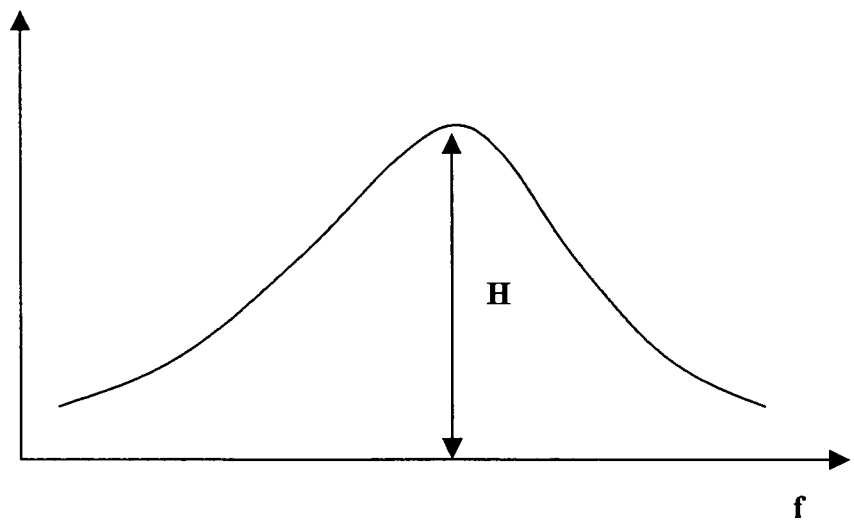
Figure 3B:
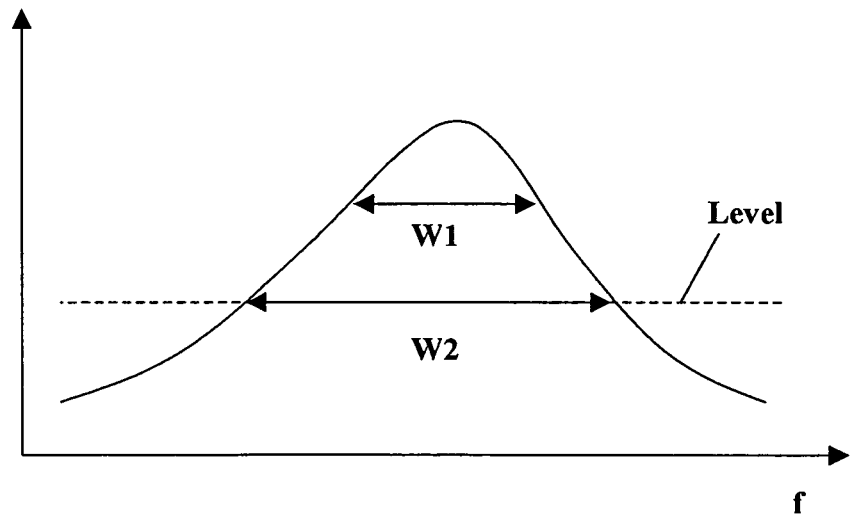
Figure 3C:
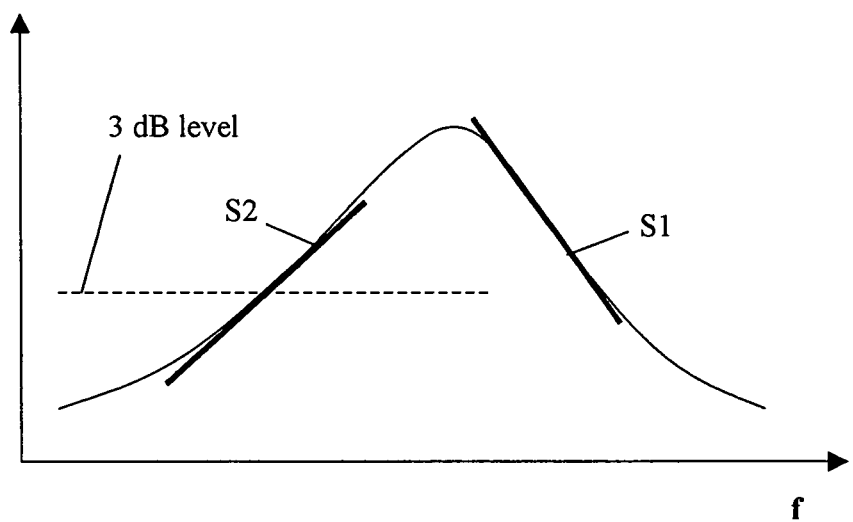
Figure 3D:
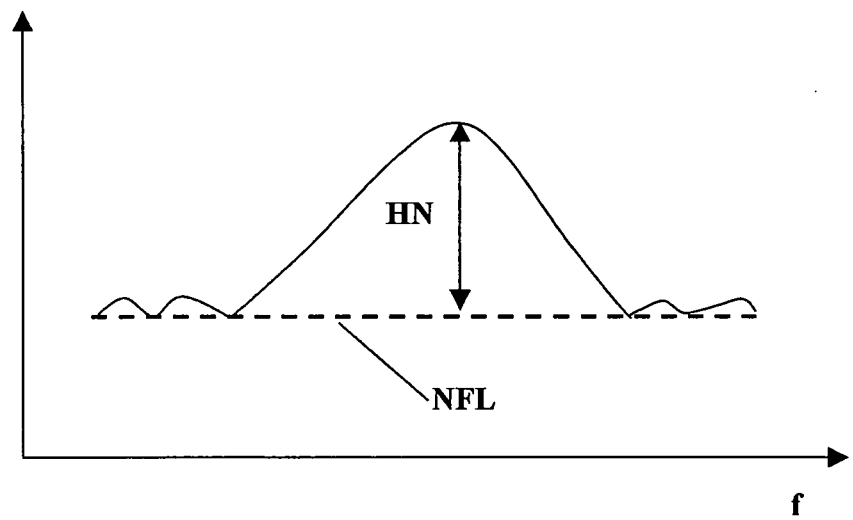
Figure 3E:
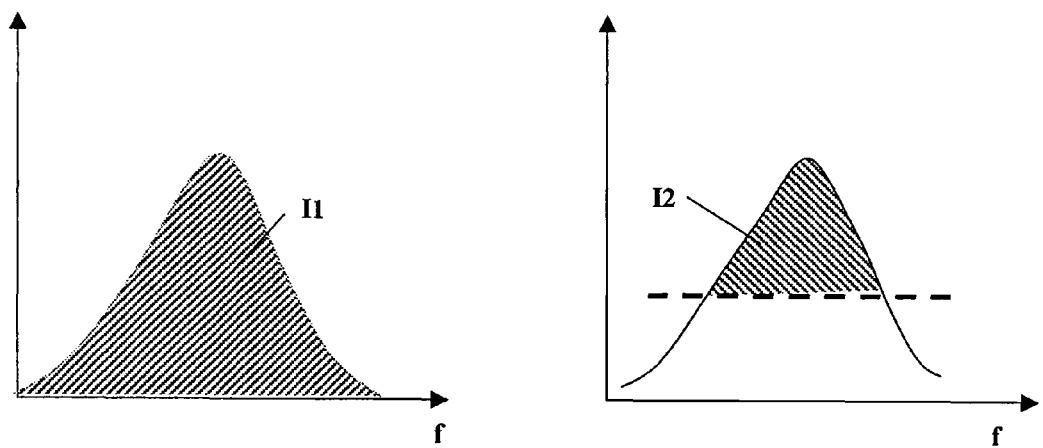
Figure 3F:
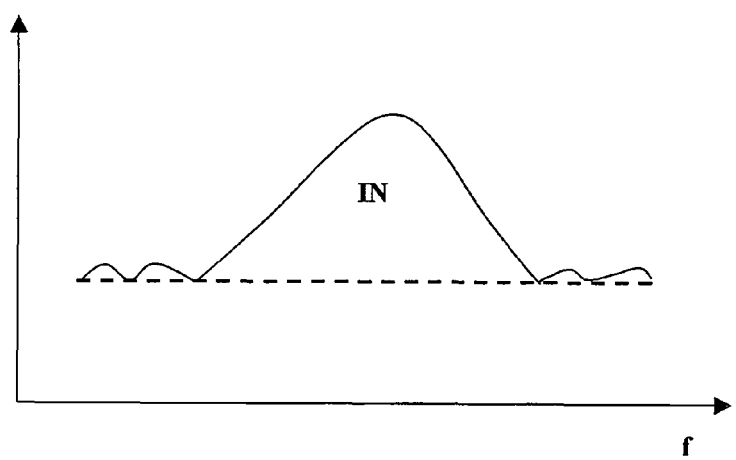

FIGS. 3a-f shows different examples of shape factors which may be used. The list of these examples is not exclusive, but may include further examples not explicitly mentioned but known to the skilled person as being capable of describing the shape of the resonance peak. Those examples, however, do not include the frequency of the resonance peak which does not reflect any characteristic of the peak shape but only the location of the peak. FIG. 3a shows the height H of the resonance peak as the shape factor, FIG. 3b shows its width W (the width W of a peak can be defined as the measured distance between the turning points W1 of the peak or at the intersection points of the peak at a predetermined level W2, e.g. at −3 dB level, of course, besides the standard 3 dB bandwidth definition, the bandwidth of the spectral peak may be defined at other levels), FIG. 3c shows its slope S (the slope S of a peak can be defined as the mean slope of the tangents at all points of one side of the peak S1 or as the tangent at a predetermined level of the peak S2), FIG. 3d shows its height HN compared to noise floor level NFL, FIG. 3e shows its integral I (the integral I of a peak can be defined as the calculated area under the peak I1 or down to a predetermined level I2, e.g. −3 dB level), and FIG. 3f shows its integral IN down to noise floor level NFL. In a further embodiment, two or more of the above mentioned shape factors may be calculated.

The shape factor calculation section 200 may be further adapted to determine the frequency of the resonance peak in the case it is not able to reliably calculate shape factors from the resonance peak. For instance, if the width of the resonance peak is large, such as during the calibration period, the shape factor calculation section 200 may determine the frequency of the resonance peak and fed the value thus determined to the tire pressure determination section 300. In general, the spectral properties of the wheel speed signal may be best understood when assuming a spring-damper model in the vertical and tangential (torsional) directions of the tire. Due to the road roughness the tire vibrates in different directions (vertically, tangentially, etc). When the tire pressure drops, the tire spring-constants decrease which affects the spectrum of the wheel speed signal and thus both the spectral shape factors and the location of the resonance peak(s). The most significant mode for the vertical vibration is typically located at about 10 to 20 Hz, whereas the torsional vibration is typically located in the band between 40 to 50 Hz. Consequently, if no sharp values for the spectral shape factors can be determined the shape factor calculation section 200 may try instead to determine values for the location (frequency value) of the resonance peak which may be more reliably used by the tire pressure determination section 300 to determine the tire pressure signal.

In a first embodiment, the multidimensional feature extraction section 250 calculates the spectrum of the wheel speed signal and extracts a multidimensional feature from the spectrum lying in a predetermined frequency band, such as a frequency vector having the frequency values of the spectrum at different frequencies as its vector components. The width of the predetermined frequency band may be in the range from 5 Hz to 50 Hz; the frequency band may start at any frequency lying between 10 Hz and 50 Hz. The dimension of the peak feature may lie between 1 and 50, in particular between 5 and 10. The vector components may be retrieved from equally spaced frequencies within the frequency band. Exemplarily, FIG. 4a shows a multidimensional feature of the curve of the spectrum in a predetermined frequency band between 30 Hz and 60 Hz.

Figure 4B:
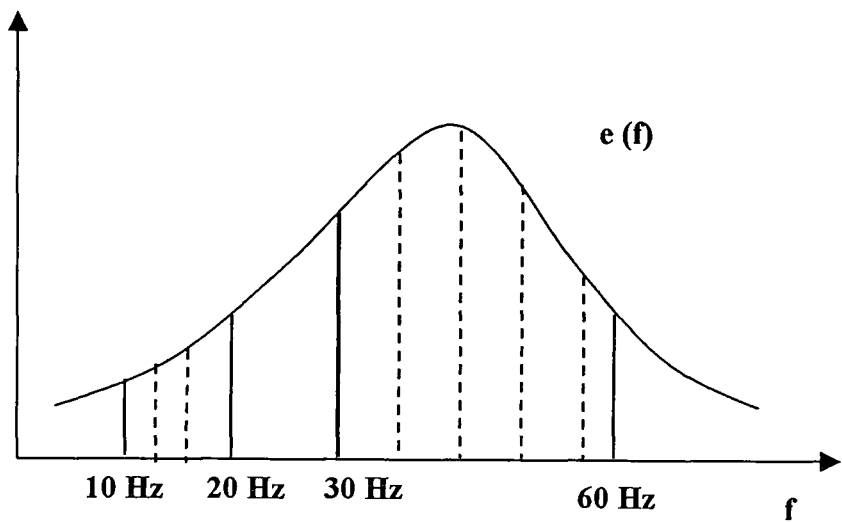

In a further embodiment, the multidimensional feature extraction section 250 extracts more than one multidimensional feature, such as two peak features lying in two (preferably non-overlapping) frequency bands of the spectrum. Exemplarily, FIG. 4b shows two such multidimensional features of the spectrum in two predetermined frequency bands between 10 Hz and 20 Hz as well as between 30 Hz and 60 Hz. Of course, the number of multidimensional features may vary.

In a still further embodiment, the multidimensional feature extraction section 250 already receives as an input the spectrum calculated by the shape factor calculation section 200 in case the latter one is of the type according to the first embodiment.

The shape factor calculation section 200 and the multidimensional feature extraction section 250 fed the at least one shape factor and the at least one multi-dimensional feature, respectively, to the tire pressure determination section 300. The tire pressure determination section 300 determines a tire pressure signal on the basis of the input values thus applied. For this, the tire pressure determination section may use some calibration values which may have been learned during a preceding calibration phase over a calibration time, for instance, between 1 min and 100 min, particularly between 5 min and 30 min, more particularly about 7 min or 20 min, after automatic or manual initiation. These calibration values relate the input values to the tire pressure determination section 300 with the tire pressure signal. The tire pressure may either be a tire pressure value or only an indication that a tire pressure drop (or raise due to an increased ambient temperature) has occurred without defining the exact tire pressure value. For instance, the input values may only be compared with (learned) threshold values and the tire pressure signal may be determined on the basis of the comparison result. Such a comparison may use a multi-dimensionally defined distance if more than one shape factor or additionally at least one multidimensional feature is used as input values to the tire pressure determination section 300.

Optionally, the determination section 300 may use further input values of external tire pressure determination modules, such as a roll-radius based tire pressure determination module being based on a wheel relative approach. These further input values may be used in a similar manner as described above. Alternatively, the output value of the above comparison result may be further combined with the input values from the external modules using any kind of statistical combination known to the skilled person, such as mean value determination, etc. A particular example on how to combine the output values of different tire pressure determination modules (wheel radius analysis WRA modules and wheel spectrum analysis WSA modules, which may be implemented by means of the shape factor calculation section 200 as described above) is disclosed in EP 1 641 639 A1 entitled to the same applicant whose content is to be incorporated into the present application by reference. Similarly, further details about the WRA modules might be also taken from this publication. The mentioned WRA modules are only an example of the more general roll radius based modules in indirect tire pressure monitoring which may be also used for the above purposes.

Similarly, the tire pressure determination section 300 may use the shape factor values and/or multidimensional features as calculated for further tires of the same vehicle and compare the same with each other in order to determine the tire pressure signal. For instance, if these values and/or features start to differ from each other to an extent greater than a predetermined threshold than a tire pressure signal is output indicating a tire pressure drop.

Summarizing, the invention calculates shape factors of resonance peaks from the spectrum or directly from the time domain of the input signal that are advantageously robust to (1) disturbances from road surface (2) narrow-band disturbances from interference of vehicle vibrations, (3) unknown tire types and/or (4) vehicle speed. As described above with respect to the prior art approaches, neither the peak frequency alone nor the spectral pattern are robust in all these cases. In contrast thereto, the shape factors are more insensitive to the noise and narrow band disturbances, wherein by shape factors a few characteristic features are meant which describe the essential form of the resonance peak. The peak's shape is in this way characterized by one or a few real numbers that are computationally cheap to compute from the wheel speed signal, implying a small memory requirement, and easy to make detection on. Further, this invention also includes the possibility to combine shape factors from several resonance peaks. These may be combined into a single, scalar shape factor. This combination is in its simplest form a fixed rule but may also be adaptive, e.g., to incorporate information about velocity, temperature, other vehicle parameters, calibration values and/or tire classification information which further makes the system robust yet sensitive and ensures that the same performance level can be achieved in different vehicles with different tires.

For instance, the spectrum from a pure spring-damper excited with random noise gives a shape with a certain peak frequency and bandwidth determined by the spring and damper constants. However, for a finite data record, the spectrum becomes a random variable, in particular, the computed frequency value of the resonance peak is random. This can to some extent be mitigated by averaging, but already in this simple case the bandwidth will be a more robust means to detect changes with spring and damper constants than the peak frequency. Further, a wheel speed signal is a sum of many different spring-damper systems, road irregularities, vehicle speed variations and so on, which further demonstrates the advantageous use of the more robust spectral shape factors. In some embodiments, however, it might be advantageous to further determine the resonance frequency together with the shape factors in order to have an even more robust means to detect changes with spring and damper constants, and thus tire pressure changes.

What is claimed is:

1. A method of estimating a tire pressure of a vehicle's tire, comprising:
    receiving as an input signal a pressure-related signal relating to the tire pressure;
    calculating at least one shape factor (H; W; S; HNL; I; ANL), of a resonance peak associated with a spectrum of the pressure-related signal on the basis of the input signal; and
    determining, with a processor, depending on said at least one shape factor (H; W; S; HNL; I; ANL), a tire pressure signal indicative of a tire pressure within the vehicle's tire, wherein the shape factor (H; W; S; HNL; I; ANL) comprises at least one of:
        the integral (I) of the resonance peak, and
        the area (ANL) under the peak down to the noise floor level.

2. The method according to claim 1, wherein the pressure-related signal is a wheel speed sensor signal indicative of the wheel speed of the vehicle's tire.

3. The method according to claim 1, wherein the tire pressure signal is also determined on the basis of a signal indicative of a wheel radius.

4. The method according to claim 1, wherein the tire pressure signal is also determined on the basis of at least one further pressure-related signal being associated with a further vehicle's tire.

5. A system of estimating a tire pressure of a vehicle's tire, comprising:
    an input section adapted to receive as an input signal a pressure related signal;
    a calculation section adapted to calculate at least one shape factor (H; W; S; HNL; I; ANL) of a resonance peak associated with a spectrum of the pressure-related signal on the basis of the input signal; and
    a determination section adapted to derive, depending on said at least one shape factor (H; W; S; HNL; I; ANL), a tire pressure signal indicative of a tire pressure within the vehicle's tire, wherein the shape factor (H; W; S; HNL; I; ANL) comprises at least one of:
        the integral (I) of the resonance peak, and
        the area (ANL) under the peak down to the noise floor level.

6. The system according to claim 5, wherein the pressure-related signal is a wheel speed sensor signal indicative of the wheel speed of the vehicle's tire.

7. The system according to claim 5, wherein the determination section is further adapted to determine the tire pressure signal on the basis of a signal indicative of a wheel radius.

8. The system according to claim 5, wherein the determination section is further adapted to determine the tire pressure signal on the basis of at least one further pressure-related signal being associated with a further vehicle's tire.

9. A non-transitory computer readable medium including program code for carrying out a method, when executed on a processing system, of estimating a tire pressure of a vehicle's tire, the method comprising:
    receiving as an input signal a pressure-related signal;
    calculating at least one shape factor (H; W; S; HNL; I; ANL) of a resonance peak associated with a spectrum of the pressure-related signal on the basis of the input signal; and
    determining, depending on said at least one shape factor (H; W; S; HNL; I; ANL), a tire pressure signal indicative of the tire pressure within the vehicle's tire, wherein the shape factor (H; W; S; HNL; I; ANL) comprises at least one of:
        the integral (I) of the resonance peak, and
        the area (ANL) under the peak down to the noise floor level.

* * * * *